W. H. GREATOREX.
STOP VALVE FOR STEAM AND OTHER FLUIDS.
APPLICATION FILED NOV. 20, 1912.
1,067,604.  
Patented July 15, 1913.  
2 SHEETS—SHEET 2.
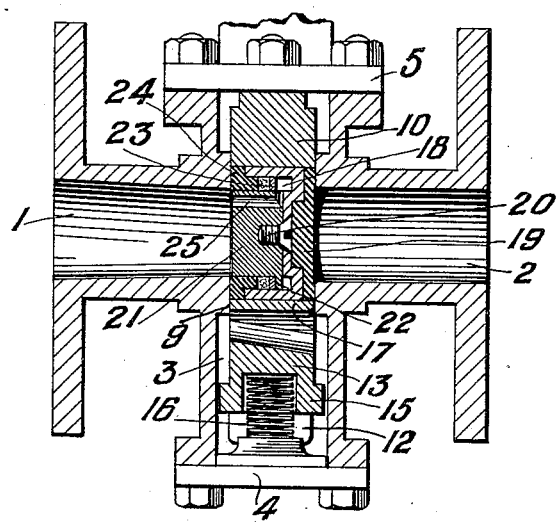
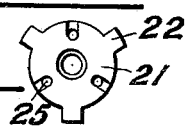
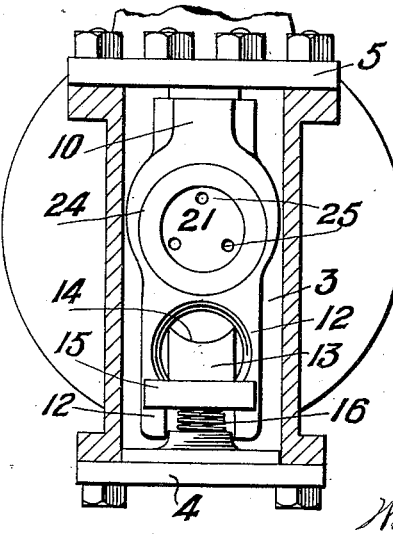

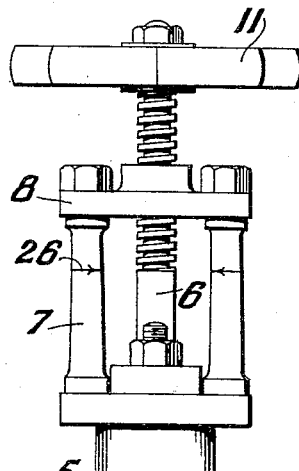
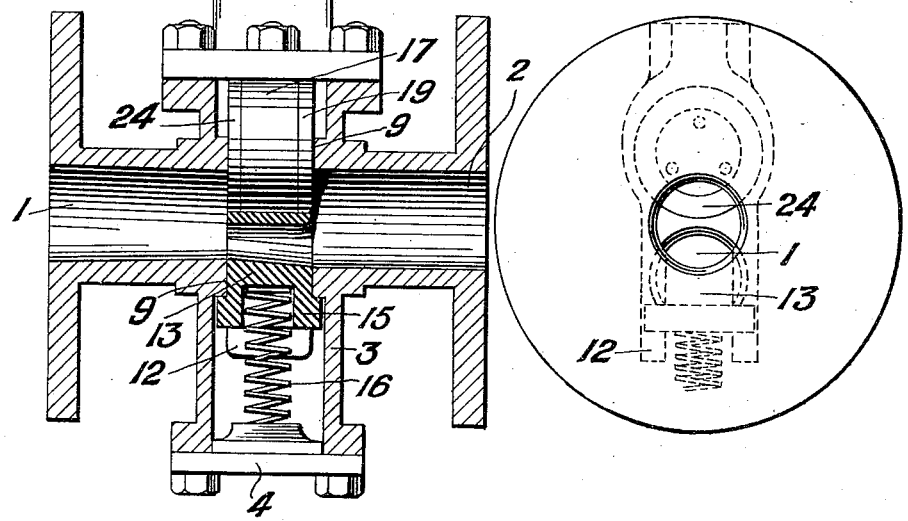

UNITED STATES PATENT OFFICE.

WILLIAM HENRY GREATOREX, OF LONDON, ENGLAND.

STOP-VALVE FOR STEAM AND OTHER FLUIDS.

1,067,604.  Specification of Letters Patent.  Patented July 15, 1913.

Application filed November 20, 1912. Serial No. 732,414.

*To all whom it may concern:*

Be it known that I, WILLIAM HENRY GREATOREX, a subject of the King of Great Britain, residing at London, England, have invented certain new and useful Improvements in Stop-Valves for Steam and other Fluids, and of which the following is a specification.

In stop valves of the type in which the valve is carried in a sliding member moving at right angles to the axis of the valve passage, the seatings on the valve casing are commonly left more or less exposed to the action of the steam or other fluid passing through the valve, except when the valve is closed or when the valve is completely open.

The valve constructed in accordance with this invention is designed to provide protection for circular valve seatings, not only when the valve is closed or completely open, but also in all usual working positions, such, for instance, as any position from one third open, to completely open. An example of construction of such a valve is illustrated in the drawings, in which—

Figure 1 is a longitudinal sectional elevation, and Fig. 2 an end elevation of a portion of the valve, both views showing it in a partly open position. Fig. 3 is a longitudinal section of the main portion of the valve, and Fig. 4 is a sectional end elevation of the valve in the position shown at Fig. 3. Figs. 5 and 6 are detail views.

The valve casing is formed with an inlet passage 1 and an outlet passage 2, separated by a box-like central chamber 3 closed at its lower end by a plate 4 and at its upper end by a cap 5 carrying the stuffing box through which the valve spindle 6 passes, and also supporting by means of posts 7 a plate 8 having a central screw-threaded aperture with which engages the screw-threaded upper end of the spindle 6.

The inner ends of the inlet and outlet passages 1 and 2 are formed with valve seatings 9 which project within the central chamber 3, and arranged to slide between the seatings 9 in a direction at right angles to the axis of the said inlet and outlet passages is a sliding member 10. This sliding member 10 is at its upper end rotatably connected to the lower end of the valve spindle 6; thus when the spindle 6 is turned by means of a hand wheel 11, the sliding member is raised or lowered in the chamber 3. At its lower end the sliding member 10 is formed with a forked extension 12, the upper end of which extension is curved to correspond with the passages 1 and 2. Adapted to slide and be guided between the arms of the forked extension 12 is a plunger 13 the upper end of which is formed with a concave surface 14. Flanges 15 are formed on the lower end of the plunger 13 which flanges contact with projections within the chamber 3, when the said plunger is pressed in an upward direction by a spring 16 between the plate 4 and the lower end of the plunger 13, the said projections being formed by the lower end of the outer circumference of the valve seatings 9. The sliding member 10 has a through aperture formed in it containing a valve adapted when the said sliding member 10 is lowered within the chamber 3, to close the exit from and the admission of fluid to, the passages 1 and 2 respectively.

In order to secure a perfect fit between the valve faces and the seatings 9 on the valve casing and to prevent leakage of fluid between the said faces and seatings when the passages 1 and 2 are closed, the valve is constructed so that the pressure of the fluid controlled by the valve shall act upon the faces of the valve so as to secure their perfect contact with the said seatings.

The valve consists of a drum 17 one end of which is closed by a plate formed on its inner surface with an annular recess 18, while on its outer face it is formed with a central recess adapted to receive a central projection on a removable valve face 19, adapted to close the inlet to the outlet passage 2. Connected to the inner surface of the end plate of the drum 17 by a screw 20, is a central cylindrical metal block 21, the diameter of which block is such as to leave an annular space between the said block 21 and the inner diameter of the side wall of the drum 17, the length of said block being such that it projects beyond the open end of the drum.

The inner end of the block 21 is formed with radial lugs or projections 22 (see Figs. 5 and 6) against which lugs a loose ring 23 (Fig. 3) bears, and surrounding the outer end of the said block is a ring 24, having an inner axially extending flange which is adapted to lie within the space between the drum and said block, while the inner face of the ring 24, contacts with the outer opened end of the drum 17, and the outer face of the said ring forms the face of the valve which contacts with its corresponding seating 9 to close the inlet from the outlet passage 1 when the valve is closed.

Extending from the face to the rear and in the direction of the axis of the block 21, are one or more holes or ports 25, said ports communicating at their rear ends with the annular recess 18 of the drum 17, so that when the valve is closed, the fluid, the flow of which the valve is controlling, passes through the said ports 25 into the recess 18, and forces the ring 24 outwardly from the drum 17, which, aided by the pressure on the block 21, forces the face 19 against its seat.

In order to indicate the minimum desirable opening of the communication between the inlet and outlet passages 1 and 2, the posts 7 are provided with marks such as 26 (Fig. 1) with which, when the spindle 6 has been screwed down the distance to secure the minimum opening of the communication, the lower end of the screw-thread on the said spindle comes into alinement. When the valve is closed, the pressure keeps the faces of the valve in good contact with the seatings 9, 9, and as the valve is opened, the plunger 13 rises by reason of its spring 16 and thus protects the lower portion of the seatings which would otherwise be exposed to the wearing action of the traveling fluid passing through the valve when it is used for admitting a restricted flow, the curved upper end of the forked extension 12 of the sliding member 10 coöperating with the plunger 13 to protect the whole of the valve seatings when the valve is fully opened.

What I claim as my invention and desire to secure by Letters Patent is:—

1. A stop valve; comprising in combination, a valve casing having a circular passage therethrough for the flow of fluid to be controlled, a member slidable within said casing in a plane at right angles to said passage, a valve carried by said sliding member adapted to contact with valve seats in said casing, a forked extension at the lower end of said sliding member said forked extension having a concave upper end to conform with the curvature of the upper portion of the circular passage and aline therewith when the valve is fully opened, a sliding plunger having a concave upper surface to conform to the curvature of the lower portion of said circular passage, said plunger being resiliently supported and movable in a vertical direction within said forked extension, and means to limit the upward movement of said plunger after said sliding member has been raised to open the valve a predetermined amount, said plunger protecting the valve seatings at said lower portion of the circular passage during further opening of the valve.

2. A stop valve; comprising in combination, a valve casing having a circular passage therethrough for the flow of fluid to be controlled, a member slidable within said casing in a plane at right angles to said passage, a valve carried freely in a through aperture in said sliding member and adapted to contact with valve seatings in said casing, a forked extension at the lower end of said sliding member, said forked extension having a concave upper end to conform with the curvature of the upper portion of said circular passage and aline therewith when the valve is fully opened, a sliding plunger having a concave upper surface to conform to the curvature of the lower portion of said circular passage said plunger being resiliently supported and movable in a vertical direction within said forked extension, flanges on said plunger to contact with projections in the valve casing to prevent the upward movement of said plunger beyond a predetermined distance upon opening the valve and retain said plunger in such a position that its upper surface forms a continuation of the lower portion of the circular passage through the valve to thereby protect the valve seatings at said lower portions.

In witness whereof I have hereunto set my hand in the presence of two witnesses.

WILLIAM HENRY GREATOREX.

Witnesses:
GRIFFITH BREWER,
WILLIAM A. MARSHALL.

---

Copies of this patent may be obtained for five cents each, by addressing the "Commissioner of Patents, Washington, D. C."